United States Patent
Balk et al.

(10) Patent No.: US 8,829,117 B2
(45) Date of Patent: *Sep. 9, 2014

(54) METHOD FOR PRODUCING ABA-TRIBLOCK COPOLYMERS WITH A WIDELY DISTRIBUTED B-BLOCK

(75) Inventors: Sven Balk, Frankfurt (DE); Holger Kautz, Haltern am See (DE); Stephan Fengler, Frankfurt (DE); Monika Maerz, Alzenau (DE); Christine Troemer, Hammersbach (DE); Lars Zander, Rommerskirchen (DE); Jens Lueckert, Barsinghausen (DE); Johann Klein, Duesseldorf (DE); Thomas Moeller, Duesseldorf (DE); Volker Erb, Duesseldorf (DE)

(73) Assignees: Evonik Roehm GmbH, Darmstadt (DE); Henkel AG & Co. KGaA, Duesseldorf (DE)

( * ) Notice: Subject to any disclaimer, the term of this patent is extended or adjusted under 35 U.S.C. 154(b) by 645 days.

This patent is subject to a terminal disclaimer.

(21) Appl. No.: 13/128,777

(22) PCT Filed: Oct. 6, 2009

(86) PCT No.: PCT/EP2009/062927
§ 371 (c)(1),
(2), (4) Date: Jul. 29, 2011

(87) PCT Pub. No.: WO2010/054893
PCT Pub. Date: May 20, 2010

(65) Prior Publication Data
US 2011/0282007 A1    Nov. 17, 2011

(30) Foreign Application Priority Data
Nov. 12, 2008  (DE) .......................... 10 2008 043 669

(51) Int. Cl.
| | | |
|---|---|---|
| C08F 2/38 | (2006.01) | |
| C08F 293/00 | (2006.01) | |
| C08F 6/02 | (2006.01) | |
| C08F 8/26 | (2006.01) | |
| C08F 8/34 | (2006.01) | |
| C09J 153/00 | (2006.01) | |
| C08L 53/00 | (2006.01) | |
| C09D 153/00 | (2006.01) | |
| C08F 2/06 | (2006.01) | |
| C08F 2/00 | (2006.01) | |

(52) U.S. Cl.
CPC . *C08F 2/001* (2013.01); *C08F 2/38* (2013.01); *C09J 153/00* (2013.01); *C08L 53/00* (2013.01); *C08F 2438/01* (2013.01); *C09D 153/00* (2013.01); *C08F 2/06* (2013.01); *C08F 293/005* (2013.01); *C08F 8/26* (2013.01); *C08F 6/02* (2013.01); *C08F 8/34* (2013.01)
USPC ............ 525/299; 525/242; 525/244; 525/288

(58) Field of Classification Search
USPC .................. 525/242, 244, 245, 288, 298, 299
See application file for complete search history.

(56) References Cited

U.S. PATENT DOCUMENTS

| | | |
|---|---|---|
| 6,143,848 A | 11/2000 | Lee et al. |
| 6,784,256 B1 | 8/2004 | Lee et al. |
| 7,868,098 B2 | 1/2011 | Loehden et al. |
| 2007/0117948 A1 | 5/2007 | Loehden et al. |
| 2009/0062508 A1 | 3/2009 | Balk et al. |
| 2009/0275707 A1 | 11/2009 | Balk et al. |
| 2009/0312498 A1 | 12/2009 | Balk et al. |
| 2009/0326163 A1 | 12/2009 | Balk et al. |
| 2010/0041852 A1 | 2/2010 | Balk et al. |
| 2010/0280182 A1 | 11/2010 | Balk et al. |

FOREIGN PATENT DOCUMENTS

| | | |
|---|---|---|
| EP | 1 637 550 | 3/2006 |
| WO | 99 20659 | 4/1999 |
| WO | 2007 033887 | 3/2007 |
| WO | 2008 012116 | 1/2008 |

OTHER PUBLICATIONS

Batt-Coutrot, D.; et al. "Synthesis and properties of amphiphilic vinyl acetate triblock copolymers prepared by copper mediated living radical polymerisation." European Polymer Journal, vol. 39, No. 12. pp. 2243-2252. XP004471978 (Dec. 1, 2003).

Ruzette, A.V.; et al."Molecular Disorder and Mesoscopic Order in Polydisperse Acrylic Block Copolymers Prepared by Controlled Radical Polymerization." Macromolecules, vol. 39, No. 17. pp. 5804-5814. XP002556195 (Jul. 22, 2006).

International Search Report issued Dec. 7, 2009 in PCT/EP09/062927 filed Oct. 6, 2009.

U.S. Appl. No. 13/125,777, filed Apr. 20, 2011, Kautz, et al.
U.S. Appl. No. 13/127,533, filed May 4, 2011, Balk, et al.
U.S. Appl. No. 13/127,534, filed May 4, 2011, Balk, et al.
U.S. Appl. No. 13/128,957, filed May 12, 2011, Kautz, et al.
U.S. Appl. No. 13/127,159, filed May 2, 2011, Balk, et al.

*Primary Examiner* — Irina S Zemel
*Assistant Examiner* — Jeffrey Lenihan
(74) *Attorney, Agent, or Firm* — Oblon, Spivak, McClelland, Maier & Neustadt, L.L.P.

(57) ABSTRACT

The invention relates to a controlled polymerization method for producing ABA-triblock copolymers on the basis of (meth)acrylate with A-blocks having a narrow, monomodal molecular weight distribution, and a B-block having a wide, monomodal molecular weight distribution. The invention further relates to the use thereof as binders in glues or sealing compounds.

20 Claims, No Drawings

METHOD FOR PRODUCING ABA-TRIBLOCK COPOLYMERS WITH A WIDELY DISTRIBUTED B-BLOCK

The invention relates to a controlled polymerization process for preparing (meth)acrylate-based ABA triblock copolymers having A blocks which have a narrow, monomodal molecular weight distribution, and a B block which has a broad, monomodal molecular weight distribution, and also to the use thereof as binders in adhesives or sealants.

Tailor-made copolymers with defined composition, chain length, molar mass distribution, etc. are a broad field of research. One of the distinctions made is between gradient polymers and block copolymers. A variety of applications are conceivable for such materials. A number of them will be briefly presented below.

Polymers may be prepared, for example, by way of ionic polymerization processes or by polycondensation or polyaddition. In these processes, the preparation of endgroup-functionalized products presents no problems. What does present a problem, however, is a targeted increase in molecular weight.

Polymers obtained through a free-radical polymerization process exhibit molecularity indices of well above 1.8. With a molecular weight distribution of this kind, therefore, there are automatically very short-chain polymers and also long-chain polymers present in the product as a whole. In a melt or in solution, the short-chain polymer chains exhibit a reduced viscosity, while in a polymer matrix they exhibit an increased mobility as compared with long-chain constituents. This has the twin effects first of improved processing properties for such polymers and second of an increased availability of polymer-bonded functional groups in a polymer composition or coating.

Long-chain by-products, in contrast, result in a more-than-proportionate increase in the viscosity of the polymer melt or solution. In addition, the migration of such polymers in a matrix is significantly reduced.

A disadvantage of free-radically prepared binders of this kind, however, is a distribution of functional groups in the polymer chain. Moreover, using a free-radical polymerization method, there is no possibility either of a hard/soft/hard triblock architecture nor of the targeted synthesis of individual polymer blocks having narrow molecular weight distributions.

Block polymers have a very sharp transition between monomers in the polymer chain, which is defined as a boundary between the individual blocks. A typical synthesis process for AB block polymers is the controlled polymerization of monomer A and, at a later point in time, the addition of monomer B. Besides the sequential polymerization by batchwise addition to the reaction vessel, a similar result can also be obtained by very sharply altering the compositions of the two monomers at particular points in time, in a procedure in which they are added continuously.

Suitable living or controlled polymerization methods include not only anionic polymerization or group-transfer polymerization but also modern methods of controlled radical polymerization such as, for example, RAFT polymerization. The ATRP method (atom transfer radical polymerization) was developed in the 1990s significantly by Prof. Matyjaszewski (Matyjaszewski et al., J. Am. Chem. Soc., 1995, 117, p. 5614; WO 97/18247; Science, 1996, 272, p. 866). ATRP yields narrowly distributed (homo)polymers in the molar mass range of $M_n$=10 000-120 000 g/mol. A particular advantage here is that the molecular weight can be regulated. As a living polymerization, furthermore, it allows the targeted construction of polymer architectures such as, for example, random copolymers or else block copolymer structures. Controlled-growth free-radical methods are also suitable particularly for the targeted functionalization of vinyl polymers. Particular interest attaches to functionalizations on the chain ends (referred to as telechelics) or in the vicinity of the chain ends. In contrast, targeted functionalization at the chain end is virtually impossible in the case of radical polymerization.

Binders with a defined polymer design can be made available through a controlled polymerization method, in the form of atom transfer radical polymerization, for example. For instance, ABA triblock copolymers have been described that possess an unfunctionalized B block and functionalized outer A blocks. Polymers of this kind are described in EP 1 475 397 with OH groups, in WO 2007/033887 with olefinic groups, in WO 2008/012116 with amine groups, and in the as yet unpublished DE 102008002016 with silyl groups. All of the polymers described in these specifications, however, have an explicitly narrow molecular weight distribution.

Via the so-called controlled polymerization processes, there have been no processes described that would enable polymers to be prepared having individual blocks or a plurality of blocks with a targetedly broad molecular weight distribution.

One method already established is that of end group functionalization of a poly(meth)acrylate with olefinic groups and the subsequent hydrosilylation of these groups. Processes of this kind are found in EP 1 024 153, EP 1 085 027, and EP 1 153 942, as well as others. The products in these specifications, however, are not block copolymers, and there is explicit reference to a molecular weight distribution of less than 1.6 for the product. A further disadvantage of these products as compared with polymers having multiply functionalized outer blocks is the higher probability of obtaining products which at one end are not functionalized. As a result of the lower degree of functionalization that results in each case as compared with the polymers of the invention, the result for further, downstream reactions, such as, for example, in the curing of sealant formulations, is a lower degree of crosslinking, and this runs counter to mechanical stability and chemical resistance.

Besides telechelics and block structures, an alternative is also represented by ATRP-synthesized—e.g., silyl-containing—(meth)acrylate copolymers having a statistical distribution and a narrow molecular weight distribution. A disadvantage of such binders is a close-knit crosslinking. Owing to the narrow molecular weight distribution, as well, binder systems of this kind have the advantages neither of particularly long or particularly short polymer chains present in the system.

Besides ATRP, other methods too are employed for the synthesis of functionalized polymer architectures. A further relevant method will be briefly described below. It is delimited from the present invention in terms both of the products and of the methodology. The advantages of ATRP over other processes are emphasized in particular:

In anionic polymerization, bimodalities may occur. These polymerization processes, however, are able to generate only certain functionalizations. For ATRP, bimodal distributions have been described for systems. The bimodality of these polymers, however, is a product in each case, first, of the presence of block copolymers and, second, of the presence of unreacted macroinitiators. A disadvantage of these processes is that the product is composed of a mixture of two different polymer compositions.

Problem

A new stage in the development are the triblock copolymers described below.

The problem addressed was that of providing a process for the synthesis of triblock polymers of the structure ABA from functionalized poly(meth)acrylates. These polymers are to be composed of A blocks with an inherently narrow molecular weight distribution of less than 1.6 and B blocks which have a monomodal, broad molecular weight distribution with not only long polymer chains but also particularly short polymer chains. There is a requirement in particular for ABA triblock copolymers whose B blocks, with a monomodal, broad molecular weight distribution, have a polydispersity index of at least 1.8, and for ABA triblock copolymers comprising these B blocks having an overall polydispersity index of at least 1.8.

In this context, ABA triblock copolymers are equated with pentablock copolymers of the composition ACBCA or CABAC.

A further problem was that of providing ABA triblock copolymers or pentablock copolymers of the composition ACBCA or CABAC in such a way that these polymers carry functional groups exclusively in the A blocks. Provided more particularly by this invention is a method for the targeted functionalization of the A blocks through the incorporation of suitable unsaturated monomers which have an additional functional group.

Another problem of the present invention, therefore, among others, is to provide a binder for adhesives and/or sealants that has a block structure, is functionalized in a targeted way in only one type of blocks, and comprises short, viscosity-reducing chains and, at the same time, long, adhesion-promoting chains.

Solution

The problem has been solved by the provision of a new polymerization process which is based on atom transfer radical polymerization (ATRP). The problem has been solved more particularly through initiation over a relatively long time period, more precisely by the metering of the initiator.

A process is provided for preparing block copolymers which is characterized in, that it is a sequentially implemented atom transfer radical polymerization (ATRP) where a bifunctional initiator is added to the polymerization solution and in that the block copolymer overall and also the block type B has a polydispersity index of greater than 1.8. The initiation is commenced with one portion of the initiator, and thereafter a second amount of the initiator is metered in continuously.

The block copolymers are prepared by means of a sequential polymerization process. This means that the monomer mixture for the synthesis of the blocks A, for example, is added to the system after a polymerization time $t_2$ only when the monomer mixture for the synthesis of block B, for example, has already undergone at least 90% reaction, preferably at least 95% reaction. This process ensures that the B blocks are free from monomers of the composition A, and that the A blocks contain less than 10%, preferably less than 5%, of the total amount of the monomers of the composition B. According to this definition, the block boundaries are located at the point in the chain at which the first repeating unit of the added monomer mixture—in this example, of the mixture A—is located. A conversion of only 95% has the advantage that the remaining monomers, especially in the case of acrylates, allow a more efficient transition to the polymerization of a second monomer composition, especially of methacrylates. In this way, the yield of block copolymers is significantly improved.

In the process of the invention, only part of the initiator for the polymerization of the monomer mixture B is included in the initial charge, for initiation, and the remainder is metered into the polymer solution over a relatively long time period. With the first batch, the polymerization is initiated. The first initiator charge makes up 10% to 60%, preferably 20% to 40%, of the overall initiator amount. The metered addition of the remaining initiator amount is commenced immediately or, with a slight time stagger, after the onset of an exotherm, but no later than after 10 minutes. Metering takes place over a time period $t_1$ which may vary according to the target molecular weight. The time $t_1$ may be between 60 minutes and 6 hours, preferably between 90 minutes and 3 hours. When metering is at an end, polymerization is continued for the polymerization time $t_2$ before the second monomer mixture A or C is added. As an example, for a target molecular weight of 10 000 g/mol to 40 000 g/mol, $t_2$ may be between 5 minutes and 6 hours, preferably between 30 minutes and 3 hours. For higher molecular weights, longer polymerization times are absolutely necessary. Through appropriate choice of the metering time $t_1$ and of the subsequent polymerization time $t_2$ it is possible to bring about targeted adjustment of the minimum molecular weight and of the breadth of the molecular weight distribution of the B blocks. The rapid commencement of metering following primary initiation ensures, furthermore, that polymer blocks B are obtained which have a monomodal molecular weight distribution.

In this way, macroinitiators of the composition B are formed for the sequential construction of block copolymers of the composition ABA. These macroinitiators inherently have a molecular weight distribution with a polydispersity index of between 1.8 and 3.0, preferably between 1.9 and 2.5. Following the polymerization time $t_2$, finally, the monomer mixture A is added. As a result of the nature of ATRP, at this point in time there are both of the previously initiated polymer species of the composition B available for the polymerization, and the polymer blocks A are constructed under the known preconditions for ATRP. These segments of the polymer chains correspondingly exhibit inherently a narrow molecular weight distribution. In the case of pentablock polymers, blocks of type C or D as well may be constructed accordingly.

A further advantage of the present invention is the prevention of recombination. With this process, therefore, the formation of particularly high molecular weights can also be prevented. Such polymer constituents would make a more-than-proportionate contribution to increasing the solution viscosity or melt viscosity. Instead, the broad-distribution, monomodal polymer prepared in accordance with the invention has an innovative polymer distribution. As a result of the inclusion of part of the initiator in the initial charge, for primary initiation, the chains are formed which are subject to the longest polymerization time and hence have the highest molecular weight in the end product. Consequently a polymer is obtained which at high molecular weights still has the characteristics of a polymer prepared by means of controlled polymerization. At low molecular weights, however, the distribution exhibits a sharp broadening of the molecular weight distribution, which is similar to that, or even broader than, the distribution of a product prepared by means of conventional free radical polymerization. The overall molecular weight distribution of the polymers prepared in accordance with the invention has a polydispersity index of greater than 1.8. In accordance with the invention, as, a measure of the nonuniformity of the molecular weight distribution, the polydispersity index is reported, as a ratio of the weight average to the number average of the molecular weights. The molecular weights are determined by means of gel permeation chromatography (GPC) against a PMMA standard.

A further embodiment of the present invention is the targeted functionalization of the A and/or D blocks in ABA, CABAL, ACBCA or CDBDC block copolymers with broad, monomodal molecular weight distribution. The problem has been solved through the preparation of block copolymers with at least 1 and not more than 4 functional groups in the individual A and D blocks, respectively, by virtue of the monomixture A and D, respectively, being composed of a composition comprising functionalized (meth)acrylates and monomers selected from the group of (meth)acrylates or mixtures thereof which have no additional functional group. The monomer mixtures B and C, in contrast, are composed exclusively of (meth)acrylates or mixtures thereof which have no additional functional group. These compositions may be identical to or different from the fraction of the monomer mixture A which has no functional groups.

It has been found in particular that block copolymers of the invention with at least 1 and not more than 2 functional groups in the individual A blocks can also be prepared. Not only the copolymers of the block A but also the copolymers of the block B and/or C may have added to them 0-50% by weight of monomers which are polymerizable by means of ATRP and which are not among the group of the (meth)acrylates.

The C blocks are polymer blocks which correspond to the basic composition of the A blocks but do not have any monomers containing further functional groups. D blocks are polymer blocks which on the one hand correspond in terms of their, basic composition to the B block and not to the C blocks, and on the other hand contain functionalized units.

Relative to the processes described in the prior art, with, for example, silyl-terminated binders in the composition, better crosslinkability can be obtained with a relevantly higher degree of functionalization in the products of the invention as well. Additionally, as a result of a distribution of the reactive groups over the terminal segments in the blocks A, an excessively close-meshed crosslinking is ruled out. By terminal segments are meant a chain section which in each case makes up 25% by mass at most and preferably 10% by mass at most, and very preferably 5% by mass at most, of the polymer chain as a whole.

The said functional groups which are present in the A blocks are restricted only through the selection of monomers which can be copolymerized by means of ATRP. The listing below serves only as an example for illustrating the invention, and is not such as to confine the invention in any way whatsoever.

Thus the A blocks may have OH groups. Hydroxy-functionalized (meth)acrylates suitable for this purpose are preferably hydroxyalkyl(meth)acrylates of straight-chain, branched or cycloaliphatic diols having 2-36 C atoms, such as, for example, 3-hydroxypropyl(meth)acrylate, 3,4-dihydroxybutyl mono(meth)acrylate, 2-hydroxyethyl(meth)-acrylate, 4-hydroxybutyl(meth)acrylate, 2-hydroxy-propyl (meth)acrylate, 2,5-dimethyl-1,6-hexanediol mono(meth) acrylate, more preferably 2-hydroxyethyl methacrylate.

Amine groups are preparable, for example, through the copolymerization of 2-dimethylaminoethyl methacrylate (DEAEMA), 2-diethylaminoethyl methacrylate (DE-AEMA), 2-tert-butylaminoethyl methacrylate (t-BAEMA), 2-dimethylaminoethyl acrylate (DMAEA), 2-diethylaminoethyl acrylate (DEAEA), 2-tert-butylaminoethyl acrylate (t-BAEA), 3-dimethylaminopropylmethacrylamide (DMAPMA) and 3-dimethylaminopropylacrylamide (DMAPA).

Polymers with allyl groups may be realized, for example, through the copolymerization of allyl(meth)acrylate. Polymers with epoxy groups through the copolymerization of glycidyl(meth)acrylate. Acid groups may be realized through the copolymerization of tert-butyl(meth)acrylate with subsequent hydrolysis and/or thermal elimination of isobutene.

Examples of (meth)acrylate-bound silyl radicals that may be recited include —$SiCl_3$, —$SiMeCl_2$, —$SiMe_2Cl$, —$Si(OMe)_3$, —$SiME(OMe)_2$, —$SiME_2(OMe)$, —$Si(OPh)_3$, —$SiMe(OPh)_2$, —$SiMe_2(OPh)$, —$Si(OEt)_3$, —$SiMe(OEt)_2$, —$SiMe_2(OEt)$, —$Si(OPr)_3$, —$SiMe(OPr)_2$, —$SiMe_2(OPr)$, —$SiEt(OMe)_2$, —$SiEtMe(OMe)$, —$SiEt_2(OMe)$, —$SiPh(OMe)_2$, —$SiPhMe(OMe)$, —$SiPh_2(OMe)$, —$SiMe(OC(O)Me)_2$, —$SiMe_2(OC(O)Me)$, —$SiMe(O-N=CMe_2)_2$ or —$SiMe_2(O-N=CMe_2)$. Where the abbreviations are as follows: Me stands for methyl-, Ph for phenyl-, Et for ethyl-, and Pr for isopropyl- or n-propyl-. An example of a commercially available monomer is Dynasylan® MEMO from Evonik-Degussa GmbH. This compound is 3-methacryloyloxypropyl-trimethoxysilane.

It is advantageous that the monomers used for the functionalization are polymerized without crosslinking reactions occurring.

The (meth)acrylate notation stands for the esters of (meth) acrylic acid and here denotes not only methacrylate, such as methyl methacrylate, ethyl methacrylate, etc., for example, but also acrylate, such as methyl acrylate, ethyl acrylate, etc., for example, and also mixtures of both.

Monomers which are polymerized both in block A and in block B are selected from the group of (meth)acrylates such as, for example, alkyl(meth)acrylates of straight-chain, branched or cycloaliphatic alcohols having 1 to 40 C atoms, such as, for example, methyl(meth)acrylate, ethyl(meth) acrylate, n-butyl(meth)acrylate, isobutyl(meth)acrylate, tert-butyl(meth)acrylate, pentyl(meth)acrylate, 2-ethylhexyl (meth)acrylate, stearyl(meth)acrylate, lauryl(meth)acrylate, cyclohexyl(meth)acrylate, isobornyl(meth)acrylate; aryl (meth)acrylates such as, for example, benzyl(meth)acrylate or phenyl(meth)acrylate which may in each case have unsubstituted or mono- to tetra-substituted aryl radicals; other aromatically substituted (meth)acrylates such as, for example, naphthyl(meth)acrylate; mono(meth)acrylates of ethers, polyethylene glycols, polypropylene glycols or mixtures thereof having 5-80 C atoms, such as, for example, tetrahydrofurfuryl methacrylate, methoxy(m)ethoxyethyl methacrylate, 1-butoxypropyl methacrylate, cyclo-hexyloxymethyl methacrylate, benzyloxymethyl methacrylate, furfuryl methacrylate, 2-butoxyethyl methacrylate, 2-ethoxyethyl methacrylate, allyl-oxymethyl methacrylate, 1-ethoxybutyl methacrylate, 1-ethoxyethyl methacrylate, ethoxymethyl methacrylate, polyethylene glycol) methyl ether(meth)acrylate and poly(propylene glycol) methyl ether(meth)acrylate.

Besides the (meth)acrylates set out above it is possible for the compositions to be polymerized also to contain further unsaturated monomers which are copolymerizable with the aforementioned (meth)acrylates and by means of ATRP. These include, among others, 1-alkenes, such as 1-hexene, 1-heptene, branched alkenes such as, for example, vinylcyclohexane, 3,3-dimethyl-1-propene, 3-methyl-1-diisobutylene, 4-methyl-1-pentene, acrylonitrile, vinyl esters such as vinyl acetate, styrene, substituted styrenes with an alkyl substituent on the vinyl group, such as α-methylstyrene and α-ethylstyrene, substituted styrenes with one or more alkyl substituents on the ring such as vinyltoluene and p-methylstyrene, halogenated styrenes such as, for example, monochlorostyrenes, dichloro-styrenes, tribromostyrenes and tetrabromostyrenes; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinyl-pyrimidine, 9-vinylcarbazole, 3-vinylcarbazole, 4-vinylcarbazole, 2-methyl-1-vinylimidazole, vinyl-oxalane, vinylfuran, vinylthiophene, vinylthiolane, vinylthiazoles, vinyloxazoles and isoprenyl ethers; maleic acid derivatives, such as, for example, maleic anhydride, maleimide, methylmaleimide and dienes such as divinylbenzene, for example, and also, in the A blocks, the respective hydroxy-functionalized and/or amino-functionalized and/or mercapto-functionalized compounds. Furthermore, these copolymers may also be prepared such that they have a hydroxyl and/or amino and/or mercapto functionality in one substituent. Examples of such monomers include vinylpiperidine, 1-vinylimidazole, N-vinylpyrrolidone, 2-vinylpyrrolidone, N-vinylpyrrolidine, 3-vinylpyrrolidine, N-vinylcaprolactam, N-vinylbutyrolactam, hydrogenated vinylthiazoles and hydrogenated vinyloxazoles. Particular preference is given to copolymerizing vinyl esters, vinyl ethers, fumarates, maleates, styrenes or acrylonitriles with the A blocks and/or B blocks.

The process can be carried out in any desired halogen-free solvents. Preference is given to toluene, xylene, $H_2O$; acetates, preferably butyl acetate, ethyl acetate, propyl acetate; ketones, preferably ethyl methyl ketone, acetone; ethers; aliphatics, preferably pentane, hexane; biodiesel; but also plasticizers such as low-molecular-mass polypropylene glycols or phthalates.

The block copolymers of the composition ABA are prepared by means of sequential polymerization.

Besides solution polymerization the ATRP can also be carried out as emulsion, miniemulsion, microemulsion, suspension or bulk polymerization.

The polymerization can be carried out under atmospheric, subatmospheric or superatmospheric pressure. The temperature of polymerization is also not critical. In general, however, it is situated in the range from −20° C. to 200° C., preferably from 0° C. to 130° C. and with particular preference from 50° C. to 120° C.

The polymer of the invention preferably has a number-average molecular weight of between 5000 g/mol and 100 000 g/mol, with particular preference between 7500 g/mol and 50 000 g/mol and with very particular preference ≤30 000 g/mol.

As bifunctional initiators there can be $RO_2C$—CHX—$(CH_2)_n$—CHX—$CO_2R$, $RO_2C$—$C(CH_3)X$—$(CH_2)_n$—$C(CH_3)X$—$CO_2R$, $RO_2C$—$CX_2$—$(CH_2)_n$—$CX_2$—$CO_2R$, RC(O)—CHX—$(CH_2)_n$—CHX—C(O)R, RC(O)—$C(CH_3)X$—$(CH_2)_n$—$C(CH_3)X$—C(O)R, RC(O)—$CX_2$—$(CH_2)_n$—$CX_2$—C(O)R, $XCH_2$—$CO_2$—$(CH_2)_n$—$OC(O)CH_2X$, $CH_3CHX$—$CO_2$—$(CH_2)_n$—$OC(O)CHXCH_3$, $(CH_3)_2CX$—$CO_2$—$(CH_2)_n$—$OC(O)CX(CH_3)_2$, $X_2CH$—$CO_2$—$(CH_2)_n$—$OC(O)CHX_2$, $CH_3CX_2$—$CO_2$—$(CH_2)_n$—$OC(O)CX_2CH_3$, $XCH_2C(O)C(O)CH_2X$, $CH_3CHXC(O)C(O)CHXCH_3$, $XC(CH_3)_2C(O)C(O)CX(CH_3)_2$, $X_2CHC(O)C(O)CHX_2$, $CH_3CX_2C(O)C(O)CX_2CH_3$, $XCH_2$—C(O)—$CH_2X$, $CH_3$—CHX—C(O)—CHX—$CH_3$, $CX(CH_3)_2$—C(O)—$CX(CH_3)_2$, $X_2CH$—C(O)—$CHX_2$, $C_6H_5$—CHX—$(CH_2)_n$—CHX—$C_6H_5$, $C_6H_5$—$CX_2$—$(CH_2)_n$—$CX_2$—$C_6H_5$, $C_6H_5$—$CX_2$—$(CH_2)_n$—$CX_2$—$C_6H_5$, o-, m- or p-$XCH_2$-Ph-$CH_2X$, o-, m- or p-$CH_3CHX$-Ph-$CHXCH_3$, o-, m- or p-$(CH_3)_2CX$-Ph-$CX(CH_3)_2$, o-, m- or p-$CH_3CX_2$-Ph-$CX_2CH_3$, o-, m- or p-$X_2CH$-Ph-$CHX_2$, o-, m- or p-$XCH_2$—$CO_2$-Ph-OC(O) $CH_2X$, o-, m- or p-$CH_3CHX$—$CO_2$-Ph-OC(O)CHX$CH_3$, o-, m- or p-$(CH_3)_2CX$—$CO_2$-Ph-OC(O)$CX(CH_3)_2$, $CH_3CX_2$—$CO_2$-Ph-OC(O)$CX_2CH_3$, o-, m- or p-$X_2CH$—$CO_2$-Ph-OC(O)$CHX_2$ or o-, m- or p-$XSO_2$-Ph-$SO_2X$ (X stands for chlorine, bromine or iodine; Ph stands for phenylene ($C_6H_4$); R represents an aliphatic radical of 1 to 20 carbon atoms, which may be linear, branched or else cyclic in structure, may be saturated or mono- or polyunsaturated and may contain one or more aromatics or else is aromatic-free, and n is a number between 0 and 20). Preference is given to using 1,4-butanediol di(2-bromo-2-methylpropionate), 1,2-ethylene glycol di(2-bromo-2-methylpropionate), diethyl 2,5-dibromo-adipate or diethyl 2,3-dibromomaleate. The ratio of initiator to monomer gives the later molecular weight, provided that all of the monomer is reacted.

Catalysts for ATRP are set out in Chem. Rev. 2001, 101, 2921. The description is predominantly of copper complexes—among others, however, compounds of iron, of rhodium, of platinum, of ruthenium or of nickel are employed. In general it is possible to use any transition metal compounds which, with the initiator, or with the polymer chain which has a transferable atomic group, are able to form a redox cycle. Copper can be supplied to the system for this purpose, for example, starting, from $Cu_2O$, CuBr, CuCl, CuI, $CuN_3$, CuSCN, CuCN, $CuNO_2$, $CuNO_3$, $CuBF_4$, Cu($CH_3COO$) or Cu($CF_3COO$).

One alternative to the ATRP described is represented by a variant of it: In so-called reverse ATRP, compounds in higher oxidation states can be used, such as $CuBr_2$, $CuCl_2$, CuO, $CrCl_3$, $Fe_2O_3$ or $FeBr_3$, for example. In these cases the reaction can be initiated by means of conventional free-radical initiators such as, for example, AIBN. In this case the transition metal compounds are first reduced, since they are reacted with the radicals generated from the conventional free-radical initiators. Reverse ATRP has been described by, among others; Wang and Matyjaszewski in Macromolecules (1995), vol. 28, p. 7572 ff.

One variant of reverse ATRP is represented by the additional use of metals in the zero oxidation state. As a result of an assumed comproportionation with the transition metal compounds in the higher oxidation state, an acceleration is brought about in the reaction rate. This process is described in more detail in WO 98/40415.

The molar ratio of transition metal to bifunctional initiator is generally situated in the range from 0.02:1 to 20:1, preferably in the range from 0.02:1 to 6:1 and with particular preference in the range from 0.2:1 to 4:1, without any intention hereby to impose any restriction.

In order to increase the solubility of the metals in organic solvents and at the same time to prevent the formation of stable and hence polymerization-inert organometallic compounds, ligands are added to the system. Additionally, the ligands facilitate the abstraction of the transferable atomic group by the transition metal compound. A listing of known ligands is found for example in WO 97/18247, WO 97/47661 or WO 98/40415. As a coordinative constituent, the compounds used as ligand usually contain one or more nitrogen, oxygen, phosphorus and/or sulfur atoms. Particular preference is given in this context to nitrogen-containing compounds. Very particular preference is enjoyed by nitrogen-containing chelate ligands. Examples that may be given include 2,2'-bipyridine, N,N,N',N'',N''-pentamethyldiethylenetriamine (PMDETA), tris(2-aminoethyl)amine (TREN), N,N,N',N'-tetramethylethylenediamine or 1,1,4,7,10,10-hexamethyltriethylenetetramine. Valuable indicators relating to the selection and combination of the individual components are found by the skilled person in WO 98/40415.

These ligands may form coordination compounds in situ with the metal compounds or they may first be prepared as coordination compounds and then introduced into the reaction mixture.

The ratio of ligand (L) to transition metal is dependent on the denticity of the ligand and on the coordination number of the transition metal M. In general the molar ratio is situated in the range 100:1 to 0.1:1, preferably 6:1 to 0.1:1 and with particular preference 3:1 to 1:1, without any intention hereby to impose any restriction.

When ATRP has taken place, the transition metal compound can be precipitated by the addition of a suitable sulfur compound. By addition of mercaptans, for example, the halogen atom at the end of the chain is substituted, with release of a hydrogen halide. The hydrogen halide—HBr, for example—protonates the ligand L, coordinated on the transition metal, to form an ammonium halide. As a result of this process, the transition metal-ligand complex is quenched and the "bare" metal is precipitated. After that the polymer solution can easily be purified by means of a simple filtration. The said sulfur compounds are preferably compounds containing an SH group. With very particular preference they are one of the chain transfer agents known from free-radical polymerization, such as ethylhexyl mercaptan or n-dodecyl mercaptan.

A broad field of application is produced for these products. The selection of the use examples is not such as to restrict the use of the polymers of the invention. Block copolymers with reactive groups of the composition ABA, ACBCA, CABAC or CDBDC may be employed preferably as prepolymers for a moisture-curing crosslinking. These prepolymers can be crosslinked with any desired polymers.

The preferred applications for the block copolymers of the composition ABA, ACBCA, CDBDC or CABAC having ≤4 silyl groups in the individual A and/or D blocks are to be found in sealants, in reactive hotmelt adhesives or in adhesive bonding compositions. Particularly appropriate uses are in sealants for applications in the fields of automotive engineering, shipbuilding, container construction, mechanical engineering and aircraft engineering, and also in the electrical industry and in the building of domestic appliances. Further preferred fields of application are those of sealants for building applications, heat-sealing applications or assembly adhesives.

The possible applications for materials produced in accordance with the invention do not, however, include only binders for sealants or intermediates for the introduction of other kinds of functionalities. EP 1 510 550, for example, describes a coating composition whose constituents include acrylate particles and polyurethanes. A polymer of the invention in a corresponding formulation would result in an improvement in the processing properties and crosslinking properties. Conceivable applications are, for example, powder coating formulations.

With the new binders it is possible to prepare crosslinkable one-component and two-component elastomers for example for one of the recited applications. Typical further ingredients of a formulation are solvents, fillers, pigments, plasticizers, stabilizing additives, water scavengers, adhesion promoters, thixotropic agents, crosslinking catalysts, tackifiers, etc. In order to reduce the viscosity it is possible to use solvents, examples being aromatic hydrocarbons such as toluene, xylene, etc., esters such as ethyl acetate, butyl acetate, amyl acetate, Cellosolve acetate, etc., ketones such as methyl ethyl ketone, methyl isobutyl ketone, diisobutyl ketone, etc. The solvent may be added as early as during the radical polymerization.

Crosslinking catalysts for hydrosilylated binders in a formulation for example with corresponding polyurethanes are the common organic tin, lead, mercury and bismuth catalysts, examples being dibutyltin dilaurate (e.g. from BNT Chemicals GmbH), dibutyltin diacetate, dibutyltin diketonate (e.g. Metatin 740 from Acima/Rohm+Haas), dibutyltin dimaleate, tin naphthenate, etc. It is also possible to use reaction products of organic tin compounds, such as dibutyltin dilaurate, with silicic esters (e.g. DYNASIL A and 40), as crosslinking catalysts. Also, in addition, titanates (e.g. tetrabutyl titanate, tetrapropyl titanate, etc.), zirconates (e.g. tetrabutyl zirconate, etc.), amines (e.g. butylamine, diethanolamine, octylamine, morpholine, 1,3-diazabicyclo[5.4.6]undec-7-ene (DBU), etc.) and/or their carboxylic salts, low molecular mass polyamides, amino organosilanes, sulfonic acid derivatives, and mixtures thereof.

One advantage of the block copolymers is the colorlessness and also the odorlessness of the product produced. A further advantage of the present invention is the restricted number of functionalities in the respective functionalized polymer blocks. A higher fraction of functional groups in the binder results in possible premature gelling or at least in an additional increase in the solution viscosity and melt viscosity.

Owing to the relatively large number of reactive groups in the chain end segment, reaction of the silyl groups is more likely and crosslinking to form a narrow-meshed elastomer proceeds considerably more quickly. Targeted control of the crosslinking density and/or the properties of the crosslinked end product is improved by a distribution of the functionalities in the end segments.

The examples given below are given for the purpose of improved illustration of the present invention, but are not apt to restrict the invention to the features disclosed herein.

EXAMPLES

The number-average and weight-average molecular weights Mn and Mw and the polydispersity index D=Mw/Mn as a measure of the molecular weight distributions are determined by means of gel permeation chromatography (GPC) in tetrahydrofuran relative to a PMMA standard.

Comparative Example 1

A jacketed vessel equipped with stirrer, thermometer, reflux condenser, nitrogen introduction tube and dropping funnel was charged under an $N_2$ atmosphere with monomer 1a (precise identification and quantity in table 1), 160 ml of propyl acetate, copper(I) oxide (for amount see table 1) and N,N,N',N'',N''-pentamethyldiethylenetriamine (PMDETA, for amount see table 1). The solution is stirred at 80° C. for 15 minutes. Subsequently, at the same temperature, an amount of an initiator 1 (see table 1), 1,4-butanediol di(2-bromo-2-methylpropionate) (BDBIB, total initiator in solution in 52 ml of propyl acetate) is added. After two minutes, the uniform metered addition of the amount of the initiator 2 (see table 1), 1,4-butanediol di(2-bromo-2-methylpropionate) (BDBIB, dissolved in propyl acetate, see above) is commenced. Metering proceeds without interruption and with a constant metering rate over the time period $t_1$. Following complete addition of initiator, the polymerization solution is stirred at the polymerization temperature for a time period $t_2$, before a sample is taken for determination of the average molar weight $M_n$ (by means of SEC) and a mixture of monomer 2a and monomer 3a (for identification and precise amount see table 1) is added. The mixture is stirred at 80° C. for two hours more and then terminated by addition of 3.0 g of n-dodecyl mercaptan. The solution is worked up by filtration over silica gel and the subsequent removal of volatile constituents by means of distillation. The average molecular weight is determined, finally, by SEC measurements. The proportion of incorporated monomer 3a is quantified by $^1$H-NMR measurements.

Example 1

In the same way as in Example 1, the monomers 1b, 2b and 3b (precise identification and quantity in table 1) are used. The metering time is $t_1$, the post-polymerization of the block B $t_2$ (precise time in table 1 in each case).

Example 2

In the same way as in Example 1, the monomers 1c, 2c and 3c (precise identification and quantity in table 1) are used. The metering time is $t_1$, the post-polymerization of the block B $t_2$ (precise time in table 1 in each case).

Example 3

In the same way as in Example 1, the monomers 1d, 2d and 3d (precise identification and quantity in table 1) are used. The metering time is $t_1$, the post-polymerization of the block B $t_2$ (precise time in table 1 in each case).

TABLE 1

|  | Comparative example 1 | Example 1 | Example 2 | Example 3 |
|---|---|---|---|---|
| Monomer 1 | 1a) n-BA | 1b) n-BA | 1c) n-BA | 1d) n-BA |
| Amount | 200.6 g | 200.6 g | 201.6 g | 200.7 g |
| Copper(I) oxide | 1.3 g | 1.3 g | 1.3 g | 1.3 g |
| PMDETA | 3.4 g | 3.3 g | 3.4 g | 3.3 g |
| Initiator1 | 0.85 g | 0.85 g | 0.81 g | 0.81 g |
| Initiator2 | 2.52 g | 2.53 g | 2.44 g | 2.44 g |
| $t_1$ | 45 min | 120 min | 180 min | 180 min |
| $t_2$ | 165 min | 60 min | 150 min | 150 min |
| Monomer 2 | 2a) n-BA | 2b) n-BA | 2d) n-BA | 2e) n-BA |
| Amount | 50.2 g | 50.4 g | 50.3 g | 51.1 g |
| Monomer 3 | 3a) MEMO | 3b) MEMO | 3c) AMA | 3d) HEMA |
| Amount | 10.4 g | 10.4 g | 6.8 g | 5.7 g |
| $M_n$ (stage 1) | 30 000 | 27 300 | 26 800 | 27 300 |
| D | 1.60 | 1.88 | 2.14 | 2.11 |
| $M_n$ (end product) | 31 900 | 31 000 | 28 800 | 29 400 |
| D | 1.81 | 1.91 | 2.09 | 2.08 |

MMA = methyl methacrylate;
n-BA = n-butyl acrylate,
MEMO = Dynasylan MEMO (3-methacryloxypropyltrimethoxysilane),
AMA = allyl methacrylate,
HEMA = 2-hydroxyethyl methacrylate.

The molecular weight distributions of the first polymerization stages are in each case monomodal and have a molecularity index D of greater than 1.8. The end products have correspondingly large molecularity indices, albeit smaller than those of the pure B blocks. This effect is a result of the higher molecular weight overall, but also shows that the polymerization of the A blocks is controlled and that the blocks per se have a narrow molecular weight distribution. The increase in the molecularity index in example 2 is attributable to a high-molecular-weight "shoulder". This results from secondary reactions of the silyl groups with partial chain dimerization.

Following removal of the solvent, the silyl-functionalized products can be stabilized by addition of suitable drying agents. This ensures a good shelflife without further increase in molecular weight. The product of comparative example 1 was not prepared in accordance with the invention. The molecularity index D, at 1.60, is significantly lower than the target 1.8. In comparison to example 2, otherwise carried out in a similar way, the metering time $t_1$ is shorter, at 45 minutes, in this case. For molecular weights of greater than 20 000 g/mol in the block B, a metering time $t_1$ of at least 60 minutes results. For shorter chain lengths, a shorter metering time, on the other hand, may well be adequate.

The transposition of the results to pentablock copolymers of the composition ACBCA or CABAC may take place in an analogous way. The synthesis of such copolymers with narrow distribution is described in, for example, the present applicant's patent application DE 102008002016, not yet laid open.

Comparative Example 2

A jacketed vessel equipped with stirrer, thermometer, reflux condenser, nitrogen introduction tube and dropping funnel was charged under an $N_2$ atmosphere with monomer 1e (precise identification and quantity in table 2), 125 ml of propyl acetate, 0.5 g of copper(I) oxide and 1.3 g of N,N,N',N",N"-pentamethyldiethylenetriamine (PMDETA). The solution is stirred at 80° C. for 15 minutes. Subsequently, at the same temperature, initiator 1,4-butanediol di(2-bromo-2-methylpropionate) dissolved in 25 ml of propyl acetate (BD-BIB, for amount see table 2) is added. After the polymerization time of three hours a sample is taken for determination of the average molar weight $M_n$ (by means of SEC) and a mixture of monomer 2e and monomer 3e (for precise identification and amount see table 2) is added. The mixture is polymerized to an anticipated conversion of at least 95% and is terminated by addition of 2.1 g of n-dodecyl mercaptan. The solution is worked up by filtration over silica gel and the subsequent removal of volatile constituents by means of distillation. The average molecular weight is determined, finally, by SEC measurements.

Comparative Example 3

In the same way as for comparative example 1, the monomers 1f, 2f and 3f (precise identification and quantity in table 2) are used.

Comparative Example 4

In the same way as for comparative example 2, the monomers 2g, 3g and 4g (precise identification and quantity in table 2) are used.

TABLE 2

|  | Comp. Ex. 2 | Comp. Ex. 3 | Comp. Ex. 4 |
|---|---|---|---|
| Monomer 1 | 1e) MMA | 1f) n-BA | 1g) n-BA |
| Amount | 81.0 g | 79.6 g | 79.6 g |
| Monomer 2 | 2e) MMA | 2f) MMA | 2g) n-BA |
| Amount | 19.9 g | 19.9 g | 20.0 g |
| Monomer 3 | 3e) MEMO | 3f) MEMO | 3g) MEMO |
| Amount | 4.8 g | 4.8 g | 4.8 g |
| Amount of initiator | 1.25 g | 1.25 g | 1.25 g |
| $M_n$ (stage 1) | 21 600 | 17 800 | 18 100 |
| D | 1.21 | 1.22 | 1.28 |
| $M_n$ (end product) | 26 800 | 20 300 | 22 500 |
| D | 1.31 | 1.36 | 1.38 |

Comparative examples 2 to 4 show that with conventional addition of initiator in one batch, polymers are formed that have relatively narrowly distributed inner blocks and polydispersity indices of less than 1.4.

The invention claimed is:

1. A process for preparing at least one block copolymer by a sequentially implemented atom transfer radical polymerization (ATRP), the process comprising:
adding a bifunctional initiator for initiating the reaction to a polymerization solution in a first portion; and, thereafter,
adding a second portion of the bifunctional initiator continuously for a period of time,
wherein the block copolymer has an ABA composition and an overall molecular weight distribution with a polydispersity index of greater than 1.8.

2. The process of claim 1, wherein block A is a copolymer having a monomodal molecular weight distribution, and
wherein block B is a copolymer having a monomodal molecular weight distribution with a polydispersity index of greater than 1.8.

3. The process of claim 2, wherein individual A blocks each make up less than 25% of an overall weight of the ABA block copolymer.

4. The process of claim 2, wherein individual A blocks each make up less than 10% of an overall weight of the ABA block copolymer.

5. The process of claim 1, further comprising:
polymerizing monomers of block C either before or after polymerizing monomers of block A, to obtain at least one copolymer with an ACBCA or CABAC composition,
wherein blocks A and C are each a copolymer block having a monomodal molecular weight distribution,
wherein there are no monomers with further functional groups than comprised in a (meth)acrylate in block C.

6. The process of claim 5, wherein the initiator is added in two portions:
the first portion of the initiator, which accounts for 10% to 60% by weight of an overall amount of initiator and is added batchwise at a start of the polymerization; and
the second portion of the initiator, which is metered in directly after addition of the first portion of the initiator to the system, with a constant metering rate,
wherein the second portion of the initiator is metered in over a period of at least 30 minutes and
metering of the second portion is ended at least 60 minutes before the addition of monomer mixture C to the polymerization solution.

7. The process of claim 1, wherein the initiator is added in two portions:
the first portion of the initiator, which accounts for 10% to 60% by weight of an overall amount of initiator and is added batchwise at a start of the polymerization; and
the second portion of the initiator, which is metered in directly after addition of the first portion of the initiator to the system, with a constant metering rate.

8. The process of claim 7, wherein the second portion of the initiator is metered in over a period of at least 30 minutes and metering of the second portion is ended at least 60 minutes before the addition of monomer mixture A to the polymerization solution.

9. The process of claim 1, wherein individual A blocks of the block copolymer have a composition with at least 1 and not more than 4 functional groups.

10. The process of claim 9, wherein the A blocks comprise, in polymerized form, at least one monomer comprising:
an unsaturated, free-radically polymerizable group; and
a second functional group selected from the group consisting of a hydroxyl group, an amine, an allyl group, a silyl group, and an epoxy group.

11. The process of claim 1, wherein one or more of the blocks comprises, in polymerized form, at least one monomer selected from the group consisting of a vinyl ester, a vinyl ether, a fumarate, a maleate, a styrene, an acrylonitrile, and a different monomer which is polymerizable by ATRP.

12. The process of claim 1, wherein the block copolymer has a number-average molecular weight of between 5000 g/mol and 100 000 g/mol.

13. The process of claim 1, further comprising:
precipitating out an ATRP catalyst after the polymerization by addition of a mercaptan or a compound comprising a thiol group, to obtain a precipitated catalyst; and
separating off the precipitated catalyst by filtration from the polymerization solution.

14. The process of claim 1, wherein the copolymer comprises, in reacted form, at least one (meth)acrylate.

15. The process of claim 1, wherein individual A blocks of the block copolymer have a composition with at least 1 and not more than 2 functional groups.

16. The process of claim 1, wherein the block copolymer has a number-average molecular weight of between 7500 g/mol and 50 000 g/mol.

17. An ABA triblock copolymer, obtained by the process of claim 1, comprising:
block A, having a monomodal molecular weight distribution; and
block B, having a broad, monomodal molecular weight distribution with a polydispersity index of greater than 1.8,
wherein the polydispersity index of the block copolymer is greater than 1.8 but less than that of block B, wherein the ABA triblock copolymer comprises at least one (meth)acrylate.

18. A hotmelt adhesive, fluid adhesive, pressure-sensitive adhesive, elastic sealant, coating material, or foam precursor, comprising the triblock copolymer of claim 17.

19. A heat-sealing composition, comprising the triblock copolymer of claim 17.

20. A crosslinkable composition, comprising the triblock copolymer of claim 17, wherein the triblock copolymer has at least one reactive functional group.

* * * * *